US006983296B1

(12) United States Patent
Muhlestein et al.

(10) Patent No.: US 6,983,296 B1
(45) Date of Patent: Jan. 3, 2006

(54) SYSTEM AND METHOD FOR TRACKING MODIFIED FILES IN A FILE SYSTEM

(75) Inventors: Mark Muhlestein, Tuscon, AZ (US); Wesley R. Witte, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 337 days.

(21) Appl. No.: 10/217,119

(22) Filed: Aug. 12, 2002

(51) Int. Cl.
G06F 17/30 (2006.01)
(52) U.S. Cl. ..................................... 707/206
(58) Field of Classification Search ............... 707/201, 707/8, 200, 203, 10, 205, 206; 709/238, 239, 709/242, 246; 797/205
See application file for complete search history.

(56) References Cited

U.S. PATENT DOCUMENTS

| 5,163,131 | A | | 11/1992 | Row et al. |
| 5,355,453 | A | | 10/1994 | Row et al. |
| 5,485,579 | A | | 1/1996 | Hitz et al. |
| 5,504,889 | A | * | 4/1996 | Burgess ..................... 707/100 |
| 5,802,366 | A | | 9/1998 | Row et al. |
| 5,819,292 | A | | 10/1998 | Hitz et al. |
| 5,931,918 | A | | 8/1999 | Row et al. |
| 5,941,972 | A | | 8/1999 | Hoese et al. |
| 5,963,962 | A | | 10/1999 | Hitz et al. |
| 6,065,037 | A | | 5/2000 | Hitz et al. |
| 6,289,356 | B1 | | 9/2001 | Hitz et al. |
| 6,425,035 | B2 | | 7/2002 | Hoese et al. |
| 6,618,735 | B1 | * | 9/2003 | Krishnaswami et al. ..... 707/203 |
| 6,629,109 | B1 | * | 9/2003 | Koshisaka .................. 707/203 |
| 6,728,964 | B1 | * | 4/2004 | Butt ........................... 719/313 |
| 6,766,334 | B1 | * | 7/2004 | Kaler et al. ................. 707/203 |
| 2004/0010524 | A1 | * | 1/2004 | Wallace et al. |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

Primary Examiner—Greta Robinson
(74) Attorney, Agent, or Firm—Cesari and McKenna, LLP (57) ABSTRACT

A technique keeps track of files that have been modified on a filer server by identifying full pathnames of files that have been modified and maintaining a listing of those pathnames for processing by the file server. The technique is illustratively-implemented by a plurality of processes executing in a file access protocol code layer of a file server embodied as a multi-protocol filer. The processes are configured to identify modified files, load the identified pathnames of the modified files onto a temporary storage element or data structure and maintain those pathnames on the data structure for a predetermined time. Thereafter, the files associated with those pathnames may be processed by a function of the filer.

17 Claims, 5 Drawing Sheets

SYSTEM AND METHOD FOR TRACKING MODIFIED FILES IN A FILE SYSTEM

FIELD OF THE INVENTION

The present invention relates to file systems and, more specifically, to a technique for efficiently tracking modified files in a file system of a file server.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application executing on a computer that "connects" to the filer over a computer network, such as a point-to-point link, shared local area network, wide area network or virtual private network implemented over a public network, such as the Internet. Each client may request the services of the file system on the filer by issuing file system protocol messages (in the form of packets) to the filer over the network.

A common type of file system is a "write in-place" file system, wherein the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Both the write-anywhere file system and the write in-place file system may be implemented on a file server configured to generate a persistent image of its active file system at a particular point in time for, e.g., storage on disk. The disk storage may be implemented as one or more storage "volumes" that comprise a cluster of physical storage devices (disks) defining an overall logical arrangement of disk space. Each volume is generally associated with its own file system. The persistent image of the active file system is useful in that it may be used in many applications, including asynchronous mirroring or other automated file system replication facilities.

Assume a client stores files organized as its home directory on a file server configured to generate a persistent image of its active file system. Some time after storing those files, the server generates the persistent image of its active file system. Assume the client thereafter performs a backup operation to (again) store all of the files in its home directory on the server. Since the persistent image was generated before the files were overwritten, the file system's notion of the files contains old contents. However, the old contents are in the persistent image; overwriting the old data blocks with new data results in allocating new blocks and writing the new data to the new blocks.

Accordingly, the majority of data in the home directory is identical to that stored during the previous backup operation and the effective behavior is that the "old" contents of each file are replaced with "new" contents that happen to be the same as the previous contents. Unfortunately, if those previous file contents already reside in the persistent disk image, the file system may be "unaware" of the fact that the new contents are identical and therefore writes the new data to new locations on the disk. This results in two copies of the same data for the same file and, hence, duplication and inefficient disk storage of the file data.

One solution to this problem is to disable generation of persistent images of an active file system on the server volume. However, this may be undesirable because those features, benefits and applications that rely on such persistent images will no longer be available to the client. Another solution is to check the contents of the file in all persistent images at the time the file is overwritten, i.e., modified. This may not always be possible because at write-time, the client may send less than one block of data per write operation (i.e., a partial write operation). Also, there could be multiple write operations before an entire block is full. These actions can result in numerous unnecessary and inefficient block comparison operations. Furthermore, the data for a file may be written to a temporary file which is subsequently renamed to the original file name. This is a common procedure for many application programs. In this case, the server cannot check for identical data until the temporary file is renamed to the original file name.

Another solution is to reduce the number duplicated blocks by having the inodes in both the active file system and the persistent disk image point to the same block. This can be accomplished if, for example, the contents of the disk block have not been modified since the time the persistent disk image (i.e. snapshot) was created. An example of a process to reduce such duplicated blocks is described in U.S. patent application Ser. No. 10/104,694, entitled File Folding Technique, by A. Kahn et al. In order to reduce duplicate data blocks, a file system requires some way to identify files that are likely candidates for such a file folding process. The candidate files could be "manually" provided to the file system, i.e., user initiated, but this would require an impractically high level of user interaction to maintain the file system. The present invention is directed to reducing inefficiencies associated with file servers when identifying such candidate files.

The present invention is further directed to keeping track of files that have been modified on a file server to thereby increase the efficiency of the server.

Moreover, the present invention is directed to keeping track of files that have been modified on a file server to identify potential candidates for other file system processes, such as the above-referenced file folding process.

SUMMARY OF THE INVENTION

The present invention relates to a technique for keeping track of files that have been modified on a file server. To that end, the technique identifies full pathnames of files that have been modified and maintains a listing of those pathnames for processing by the file server. The technique is illustratively implemented by a plurality of processes executing in a file access protocol code layer of a file server embodied as a multi-protocol filer. The processes are configured to identify modified files, load the identified pathnames of the modified files onto a temporary storage element or data structure and maintain those pathnames on the data structure until the files associated with those pathnames are processed by a function of the filer.

When modifying an existing or original file, some applications write the modifying data to a temporary file in response to a save (close) operation. The temporary file is then renamed to the name of the existing or original file. This prevents against data loss in the event of problems writing to the existing or original file. However, there is a time period between the closing and renaming of a modified file. Therefore, according to an aspect of the invention, pathname entries on the data structure are "aged" for a predetermined time to provide sufficient time to "catch" the rename operations.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
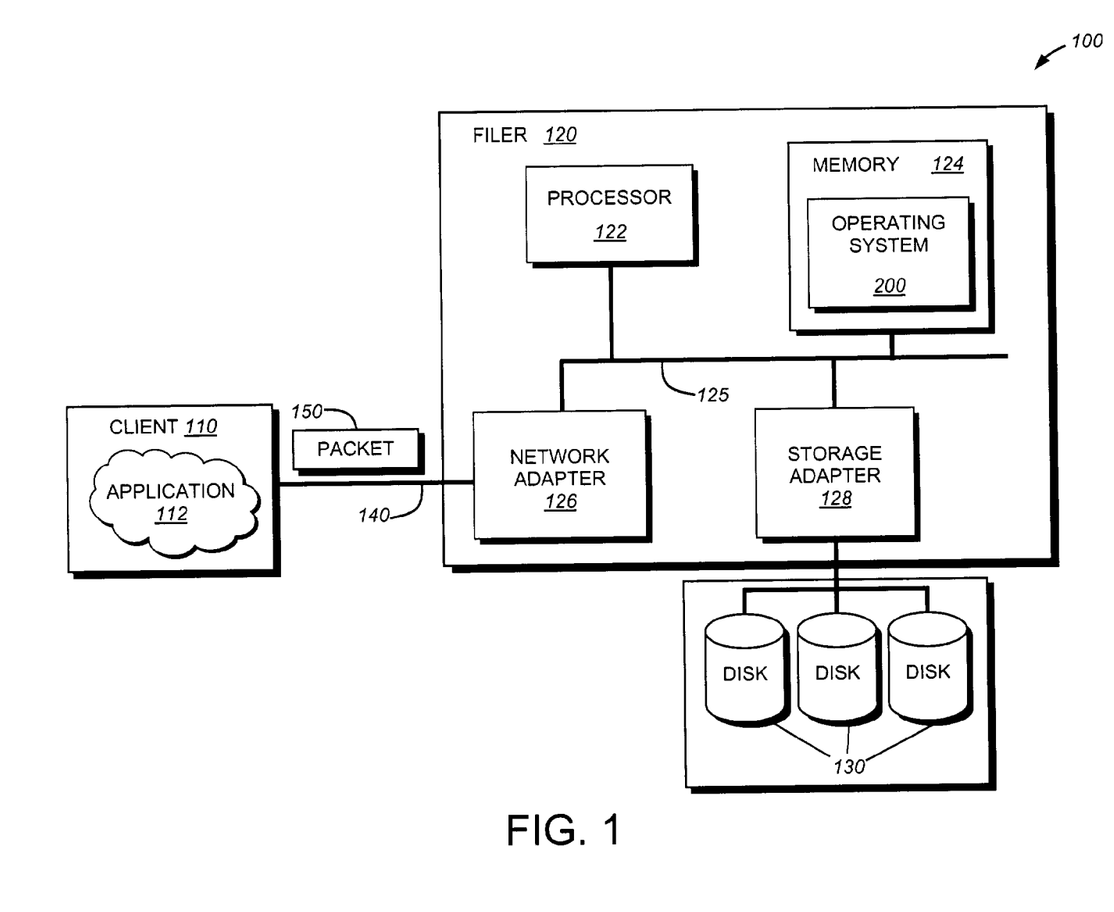
FIG. 1 is a schematic block diagram of a network environment including a file server that may be advantageously used with the present invention.

FIG. 1 is a schematic block diagram of a network environment 100 including a file server, such as a network storage appliance, that may be advantageously used with the present invention. The file server (or filer) 120 is a computer that provides file service relating to the organization of information on storage devices, such as disks 130. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol format over the network 140.

The storage adapter 128 cooperates with the storage operating system 200 executing on the filer to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Storage of information on the filer is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored.

In the illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate file system, including a write in-place file system, configured to generate a persistent image of the active file system at a particular point in time can be used. As such, where the term "WAFL" is employed, it should be taken broadly to refer to any file system that is otherwise adaptable to the teachings of this invention.

Figure 2:
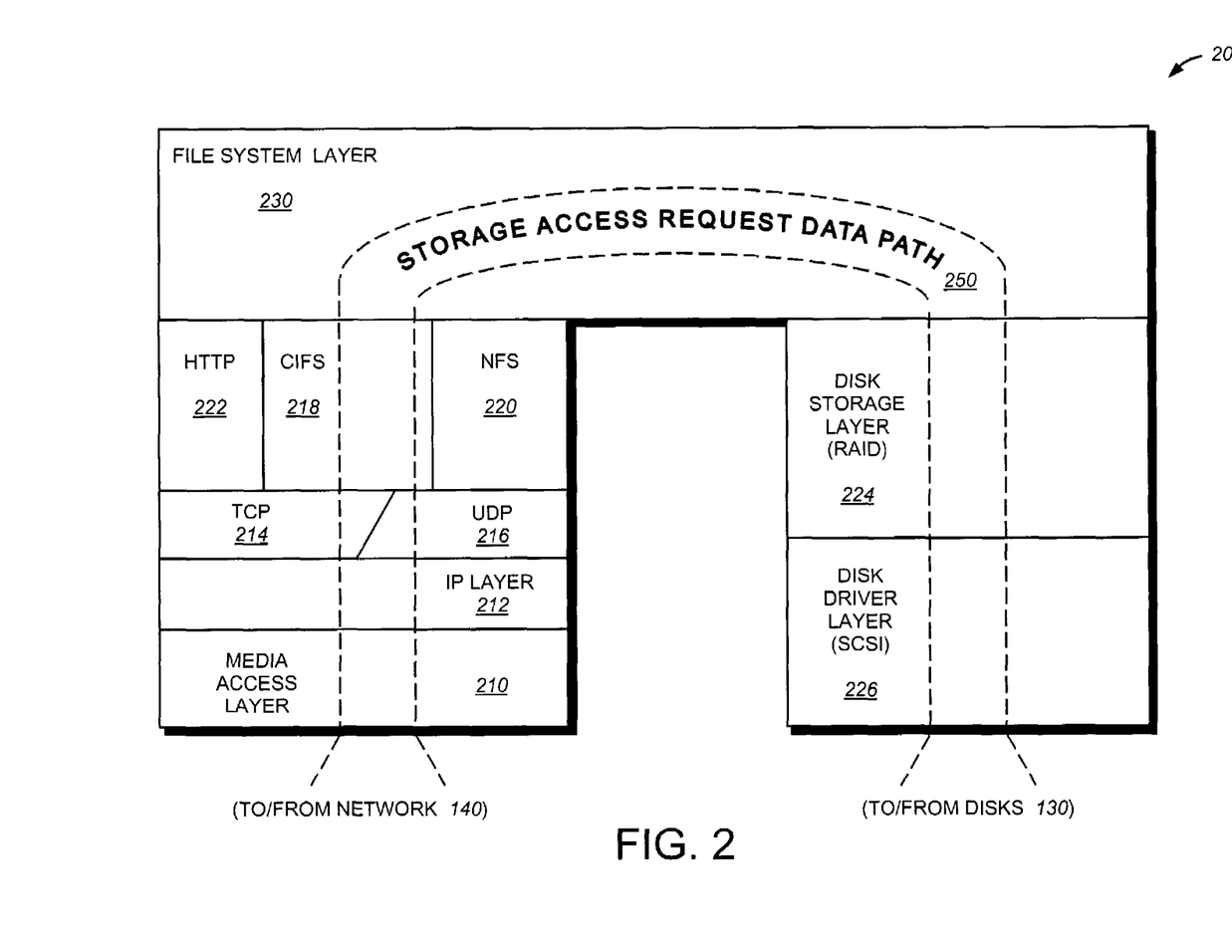
FIG. 2 is a schematic block diagram of a storage operating system that may be advantageously used with the present invention.

FIG. 2 is a schematic block diagram of the illustrative Data ONTAP operating system 200 that may be advantageously used with the present invention. The storage operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the Network File System (NFS) protocol 220 and the Hypertext Transfer Protocol (HTTP) protocol 222. In addition, the storage operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a file system layer 230 that preferably implements the WAFL file system. The on-disk format representation of the file system is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk.

Broadly stated, all inodes of the WAFL file system are organized into the inode file. A file system (FS) info block specifies the layout of information in the file system and includes an inode of a file that includes all other inodes of the file system. Each volume (file system) has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as, e.g., a conventional CIFS protocol packet 150 over the computer network 140 and onto the filer 120 where it is received at the network adapter 126. A network driver of the media access layer 210 processes the packet, passes it onto the network protocol layers 212–216 and CIFS layer 218 for additional processing prior to forwarding to the file system layer 230. Here, the file system generates operations to load (retrieve) the requested data from disk 130 if it is not resident "in core", i.e., in the memory 124. If the information is not in the memory, the file system layer 230 indexes into the inode file using the inode number to access an appropriate entry and retrieve a logical volume block number (VBN). The file system layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in memory 124 for processing by the filer. Upon completion of the request, the filer (and operating system) returns a reply to the client 110 over the network 140.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable on a computer that manages data access and may, in the case of a filer, implement file system semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The WAFL file system is adapted to "freeze frame" itself at any point in time and make that frozen versions of the file system available via special subdirectories that appear in the current (active) file system. Each freeze-framed version of the file system is called a snapshot™. The snapshot operates at the block level of the WAFL file system and represents a persistent image of the active file system at a particular point in time, e.g., at a consistency point (CP) transition. Rather than discarding the old copy of the file system at the CP, the WAFL file system saves it as a snapshot. Thus, snapshots enable the filer to save copies of its file system state at various times. The in core and on-disk format structures of the WAFL file system, including snapshots, inodes and the inode file, are disclosed and described in U.S. Pat. No. 5,819,292 titled Method for Maintaining Consistent States of a File System and for Creating User-Accessible Read-Only Copies of a File System by David Hitz et al., issued on Oct. 6, 1998, which patent is hereby incorporated by reference as though fully set forth herein.

It should be noted that "snapshot" is a trademark of Network Appliance, Inc. It is used for purposes of this patent to designate a persistent CP image. A persistent CP image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (meta-data) is about the active file system at the particular point in time for which the image is taken. The terms "PCPI" and "snapshot" shall be used interchangeably through out this patent without derogation of Network Appliance's trademark rights.

The present invention relates to a technique for keeping track of files that have been modified on a file server, such as filer 120, configured to generate a persistent image of its active file system (i.e., a snapshot) at a point in time. To that end, the technique identifies full pathnames (i.e., pathnames and filenames) of files in a volume that have been modified and maintains a listing of those pathnames for processing by the file server. Note that a pathname may represent directories or folders within the hierarchical structure of the file system, whereas the filename represents a file accessible using that pathname. The technique is illustratively implemented by a plurality of cooperating processes executing in a file access protocol layer of the storage operating system 200. The processes are configured to identify modified files, load the identified pathnames of the modified files onto a temporary storage element and maintain those pathnames on the storage element for a predetermined time.

Figure 3:
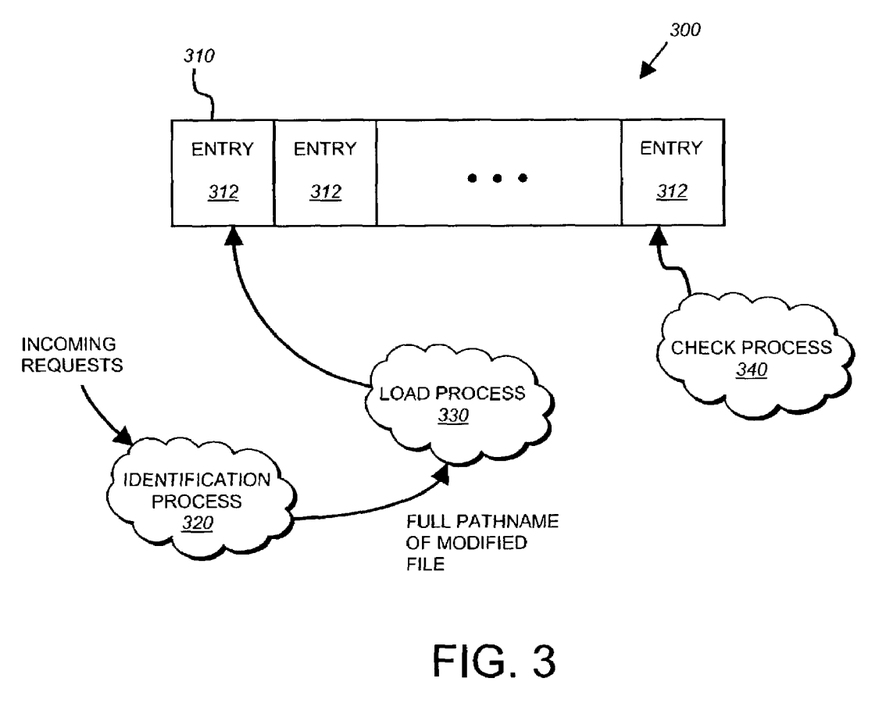
FIG. 3 is a schematic block diagram of a modified files tracking arrangement that may be advantageously used with the present invention.

FIG. 3 is a schematic block diagram of a modified files tracking arrangement 300 that may be advantageously used with the present invention. When data is stored by a client (via a write operation) to the "live" file system, a storage element or data structure in the multi-protocol file access layer (e.g., the CIFS layer 218) of the storage operating system 200 is updated to reflect the newly written data at the granularity of a file. This data structure is illustratively organized as a linked-list or queue 310 having a plurality of entries 312 organized in memory 124 of the filer. The entries 312 of the queue 310 contain a list of modified files, wherein each entry 312 includes a full pathname to a file that has been modified by an incoming (CIFS) request to the filer.

Specifically, the modified files are illustratively identified as files that are accessed via CIFS write operations and are subsequently closed via CIFS save or close operations. Administrative "deamon" processes executing in the CIFS layer 218 are configured to identify files that have been modified (e.g., an identification process 320), load the queue with pathnames of the modified files (e.g., a load process 330) and check to ensure that the pathnames are maintained on the queue for the predetermined time (e.g., a check process 340). Thereafter, the files associated with those pathnames may be processed by a function of the filer. For example, each modified file entry may be forwarded to a hardware or software function of the filer configured to compress the modified file in accordance with a compression algorithm.

Alternatively, the aged file entry may be forwarded to the file system layer 230 for processing in accordance with a file folding process. Here, the arrangement 300 may be embodied as a CIFS "front-end" engine within the CIFS layer 218 that is adapted to identify files that are candidates for folding by the file folding process. The aged file entry is forwarded to the file system via an application programming interface call, e.g., a FILE_FOLD primitive, which includes the full pathname of the file as an argument. Upon calling into the file system, the file folding process is invoked to process the pathname associated with the primitive.

Broadly stated, the file folding process scans the candidate file in the active file system and compares the contents of its data blocks with the contents of the data blocks of the same file in the most recent ("newest") persistent image. If a block is identical, the "new" block from the active file system is freed and the file is updated to refer to the "old" block in the persistent image. This reduces disk space consumption in a file server configured to generate persistent images of its active file system and, in particular, reduces overall persistent image disk usage. An example of a file folding process that may be advantageously used with the present invention is described in U.S. patent application Ser. No. 10/104,694, titled File Folding Technique, by A. Kahn et al, which application is hereby incorporated by reference as though fully set forth herein.

When modifying an existing or original file, some client applications 112 store (write) the modifying data to a temporary file in response to a save (close) operation. Examples of these applications include Microsoft productivity applications, such as Excel, PowerPoint or Word. Thereafter, the temporary file is renamed to the name of the existing or original file. This prevents against data loss in the event of problems writing to the existing or original file. However, there is a finite time period between the closing and renaming of a modified file. Therefore, pathname entries on the queue are "aged" for the predetermined time, e.g., 200 milliseconds, to provide sufficient time to "catch" the rename operations.

For example, assume a client 110 makes changes to an original file having a full pathname a\b\x.doc and those changes are saved to a file xyz.tmp by a Word application 112. The full pathname of the temporary file \a\b\xyz.tmp is loaded onto queue 310 as an entry 312 of the list of modified files. The application 112 then renames the xyz.tmp file to the original file x.doc. It should be noted that each rename operation has a "from" pathname (e.g., \a\b\xyz.tmp) and a "to" pathname (\a\b\x.doc). The appropriate administrative deamon processes then cooperate to locate and, if found, convert the temporary pathname loaded onto the queue into the original pathname.

Figure 4:
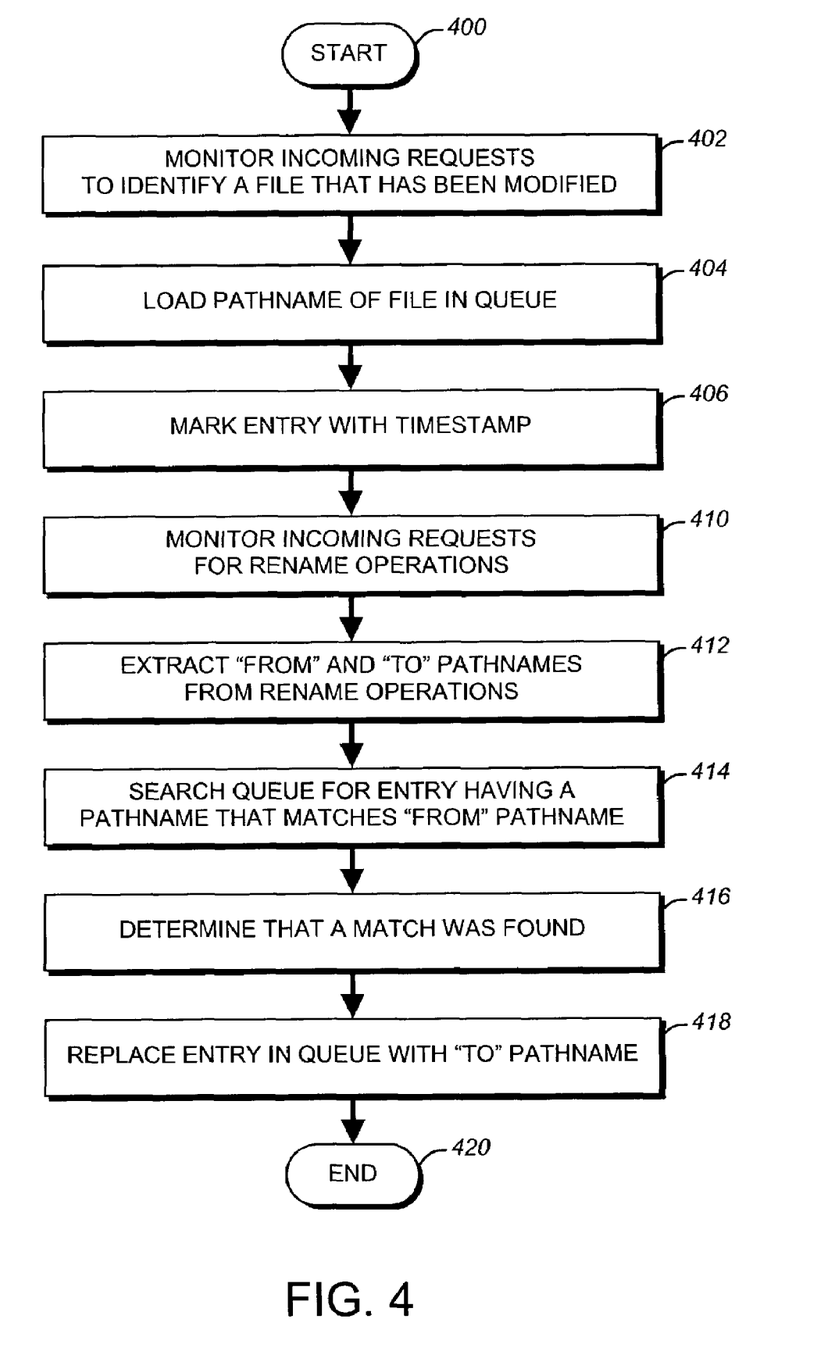
FIG. 4 is a flowchart illustrating a sequence of steps for implementing the modified files tracking technique in accordance with the present invention.

FIG. 4 is a flowchart illustrating a sequence of steps for implementing the modified files tracking technique in accordance with the present invention. The sequence starts at Step 400 and proceeds to Step 402 where the identification process executing in CIFS layer monitors incoming CIFS requests to identify a file that has been modified and provides a full pathname of this file to the load process. The load process loads an available entry of the queue with the pathname of the modified file (Step 404) and, possibly, a file handle of the file. In Step 406, the load process further marks the entry with a time stamp indicating the time at which the pathname was placed on the entry of the queue.

The identification process monitors incoming CIFS requests for operations that rename files in Step 410. Upon identifying a rename operation, the identification process extracts the "from" and "to" pathnames in Step 412, and then forwards them to the load process. In Step 414, the load process "walks" the queue searching for an entry having a pathname that matches the "from" pathname of the rename operation. In Step 416, a determination is made as to whether a match is found. If a match is found, the load process replaces (converts) the pathname of the matching entry with the "to" pathname from the rename operation in Step 418. The process then ends at step 420.

Figure 5:
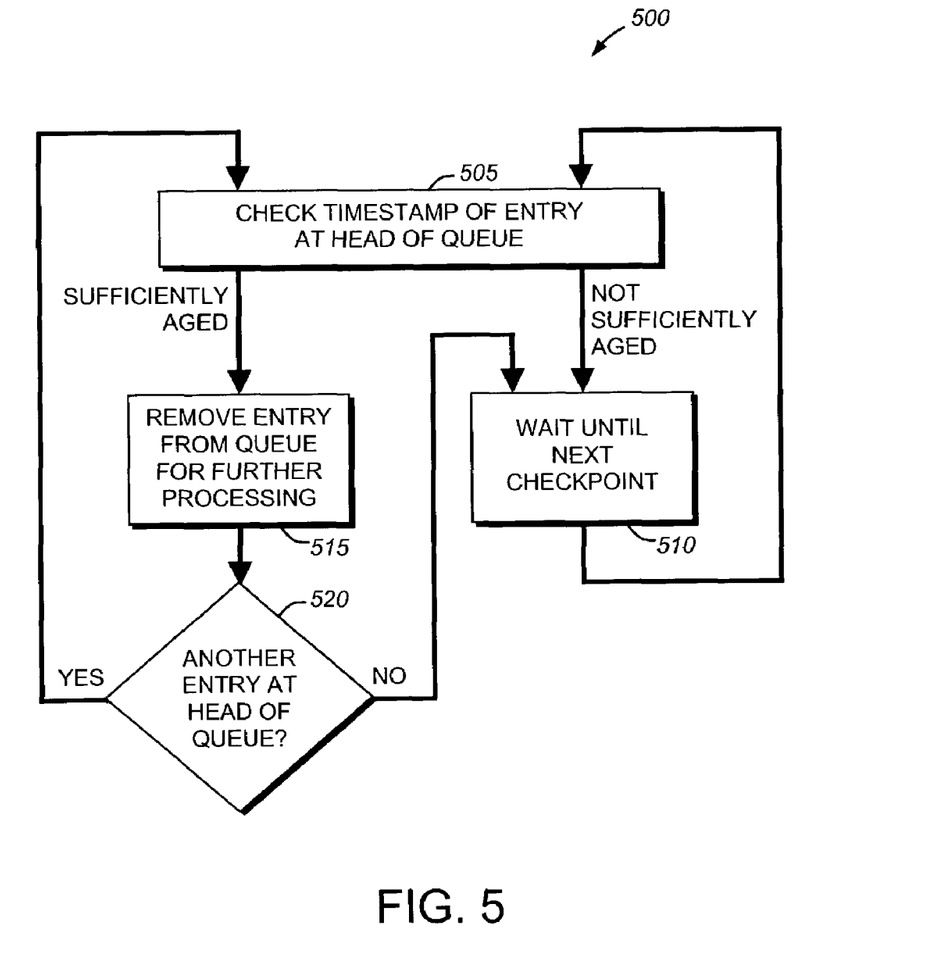
FIG. 5 is a flowchart illustrating a sequence of steps for ensuring that entries are sufficiently aged in accordance with the present invention.

The procedure 500 performed by the check process is shown in FIG. 5. Initially, in Step 505, the check process checks the time stamp of the entry at the top (i.e., "head") of the queue to determine whether it has been stored on the queue for the predetermined time (i.e., whether the entry has sufficiently "aged"). The check process illustratively checks the entry at the head of the queue for aging at predetermined periodic intervals ("checkpoints"). If the entry has not sufficiently aged, the check process waits until a next checkpoint (Step 510) and then returns to Step 505. If the entry has sufficiently aged; it is retrieved from the queue and forwarded to a function of the filer for future processing (Step 515). In Step 520, the check process determines whether there is another entry at the head of the queue and, if so, the sequence returns to Step 505. In this manner, the check process may process as many entries as possible during each checkpoint. If there is not another entry at the head of the queue (Step 520), the process waits until the next checkpoint (step 515) before looping to step 505.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for tracking modified files in a filer server having a file system,
the method comprising the steps of:
identifying a file that has been modified;
loading a pathname of the modified file onto a first entry of a queue;
checking, at a predetermined interval, a time stamp of a second entry at a head of the queue to determine if the second entry is of a sufficient age; and
removing the pathname from the second entry if the second entry is of a sufficient age.

2. The method of claim 1 further comprising the step of forwarding the removed pathname to a function of the file system for further processing.

3. The method of claim 1 further comprising the steps of, after the step of loading:
receiving a rename operation associated with a file; and
replacing a pathname of an entry associated with the rename operation with a new pathname in response to a rename operation.

4. The method of claim 1 wherein the step of identifying further comprises the steps of:
monitoring file access protocol requests;
identifying close operations directed to a file; and
identifying the file that the close operation was directed to as the modified file.

5. The method of claim 4 wherein the file access protocol request comprises a common internet file system protocol request.

6. The method of claim 2 wherein the step of forwarding comprises the step of passing the removed pathname to a file folding process.

7. The method of claim 2 wherein the step of forwarding comprises the step of passing the removed pathname to a compression procedure.

8. A system configured to track modified files stored on a storage device of a storage system having an active file system, the system comprising:
a processor coupled to the storage device;
a memory coupled to the processor and having locations addressable by the processor;
a storage operating system resident in the memory locations and executed by the processor to invoke storage operations in support of the file system, the storage operating system adapted to (i) monitor incoming file system requests to identify a file that has been modified, (ii) load a pathname of the modified file on a first entry of a queue having a plurality of entries marked with time stamps indicating the time at which pathnames were placed on the queue, (iii) at regular or preset intervals, check the time stamp of a second entry at a head of the queue, (iv) determine if the time stamp of the second entry is sufficiently aged, and (v) if so, passing the pathname stored on the second entry to a file system function for further processing.

9. A storage operating system for use on a file server, the storage operating system comprising:
an identification process configured to identify files that have been modified;
a load process cooperating with the identification process and adapted to store pathnames of the identified modified files on a queue to allow the pathnames to sufficiently age;
a check process adapted to determine that the pathnames are maintained on the queue until the pathnames are determined to have sufficiently aged based on a timestamp and a predetermined period of time.

10. A method for tracking modified files in a file system, the method comprising the steps of:
detecting modified files;
storing the pathnames of the modified files on a queue to allow the pathnames to sufficiently age;
waiting until the pathnames are determined to have sufficiently aged based on a timestamp and a predetermined amount of time;
removing the pathnames from the queue; and
forwarding the pathnames to a file system function for further processing.

11. An apparatus for tracking modified files in a file system, the apparatus comprising:
means for detecting modified files;
means for storing a list of pathnames of modified files to allow the pathnames to sufficiently age, where the list of pathnames are determined to have sufficiently aged based on a timestamp and a predetermined period of time; and
means for forwarding the pathnames to a file system function for further processing.

12. The apparatus of claim 11 wherein the means for detecting modified files further comprises means for monitoring file access protocol requests.

13. A computer readable medium containing executable programmable instructions for a computer to track modified files in a file system, the executable programs instructions comprising program instructions for:
(a) identifying a file that has been modified;
(b) storing a pathname of the modified file on an entry of a queue;
(c) at a predetermined interval, checking a time stamp of an entry at a head of the queue to determine if the entry is of a sufficient age;

(d) in response to the head entry not being of a sufficient age, returning to step (c);

(e) in response to the head entry being of a sufficient age, removing the pathname of the head entry and forwarding the removed pathname to a file system function for further processing;

(f) determining if another entry exists at the head of the queue; and (g) in response to another entry existing at the head of the queue, returning to step (c).

14. Electromagnetic signals propagating on a computer network, comprising:

said electromagnetic signals carrying instructions for execution on a processor for a computer to track modified files in a file system, the executable programs instructions comprising program instructions for:

(a) identifying a file that has been modified;

(b) storing a pathname of the modified file on an entry of a queue;

(c) at a predetermined interval, checking a time stamp of an entry at a head of the queue to determine if the entry is of a sufficient age;

(d) in response to the head entry not being of a sufficient age, returning to step (c);

(e) in response to the head entry being of a sufficient age, removing the pathname of the head entry and forwarding the removed pathname to a file system function for further processing;

(f) determining if another entry exists at the head of the queue; and (g) in response to another entry existing at the head of the queue, returning to step (c).

15. A method for aging modified files in a filer server having a file system, the method comprising the steps of:

identifying a modified file, where the modified file includes at least one change to an original file;

writing a pathname of the modified file to a queue with a timestamp;

waiting a predetermined period based on the timestamp for the file to sufficiently age; and changing the pathname of the modified file to replace the original file.

16. An apparatus configured to age modified files in a file server having a file system, the system comprising:

means for identifying a modified file, where the modified file includes at least one change to an original file;

means for writing a pathname of the modified file to a queue with a timestamp;

means for waiting a predetermined period based on the timestamp for the file to sufficiently age; and means for changing the pathname of the modified file to replace the original file.

17. A system configured to age modified files stored on a storage device, the system comprising:

a processor coupled to the storage device;

a memory coupled to the processor and having locations addressable by the processor;

a storage operating system resident in the memory locations and executed by the processor to invoke storage operations in support of an active file system, the storage operating system adapted to (i) identify a modified file, where the modified file includes at least one change to an original file, (ii) write a pathname of the modified file to a queue with a timestamp, (iii) wait a predetermined period based on the timestamp for the file to sufficiently age, and (iv) change the pathname of the modified file to replace the original file.

* * * * *